(12) United States Patent
Chen

(10) Patent No.: US 11,990,837 B2
(45) Date of Patent: May 21, 2024

(54) POWER CONVERTER AND POWER CONVERSION METHOD USING THE SAME

(71) Applicant: LITE-ON TECHNOLOGY CORPORATION, Taipei (TW)

(72) Inventor: Jing-Hsiao Chen, Taipei (TW)

(73) Assignee: LITE-ON TECHNOLOGY CORPORATION, New Taipei (TW)

( * ) Notice: Subject to any disclaimer, the term of this patent is extended or adjusted under 35 U.S.C. 154(b) by 279 days.

(21) Appl. No.: 17/736,835

(22) Filed: May 4, 2022

(65) Prior Publication Data

US 2022/0368228 A1 Nov. 17, 2022

Related U.S. Application Data

(60) Provisional application No. 63/187,973, filed on May 13, 2021.

(30) Foreign Application Priority Data

Apr. 1, 2022 (TW) .................................. 111112812

(51) Int. Cl.
*H02M 3/156* (2006.01)
*H02M 3/157* (2006.01)

(52) U.S. Cl.
CPC ......... *H02M 3/1566* (2021.05); *H02M 3/157* (2013.01)

(58) Field of Classification Search
CPC ............................ H02M 3/1566; H02M 3/157
USPC .......................................................... 323/283
See application file for complete search history.

(56) References Cited

U.S. PATENT DOCUMENTS

| 9,473,028 B1* | 10/2016 | Hoyt ....................... H02M 1/32 |
| 9,537,402 B2* | 1/2017 | Kurauchi .......... H02M 3/33507 |
| 9,979,302 B2* | 5/2018 | Cattani ............. H02M 3/33515 |
| 10,181,794 B1* | 1/2019 | Chang .................. H02M 3/285 |

* cited by examiner

*Primary Examiner* — Yemane Mehari
(74) *Attorney, Agent, or Firm* — Innovation Counsel LLP

(57) ABSTRACT

A power converter includes a voltage control unit, a current control unit and a hysteresis control unit. The voltage control unit generates a first current command. The hysteresis control unit couples the voltage control unit with the current control unit and is configured to: in the first mode, decouple the voltage control unit and the current control unit and generate a second current command to be transmitted to the current control unit when the detection current reaches the first threshold value, and couple the voltage control unit with the current control unit and transmit the first current command generated by the voltage control unit to the current control unit when the first current command reaches a second threshold value for switching to a second mode from the first mode. The current control unit outputs a mode control signal according to the first current command and the second current command.

18 Claims, 5 Drawing Sheets

POWER CONVERTER AND POWER CONVERSION METHOD USING THE SAME

This application claims the benefit of U.S. provisional application Ser. No. 63/187,973, filed May 13, 2021, and Taiwan application Serial No. 111112812, filed Apr. 1, 2022, the subject matters of which are incorporated herein by references.

TECHNICAL FIELD

The disclosure relates in general to a power converter and a power conversion method using the same, and more particularly to a grid-tied dual-mode power converter and a power conversion method using the same.

BACKGROUND

During the mode switching process of a conventional power converter, the switching path will oscillate at a commutation point (or "crossover point") of the two modes. Such oscillation may easily cause a state equation of automatic control to be out of control. Therefore, how to propose a new power converter to solve the problem of commutation oscillation is one of the efforts of those skilled in the art.

SUMMARY

According to an embodiment, a power converter is provided. The power converter includes a voltage control unit, a current control unit and a hysteresis control unit. The voltage control unit is configured to generate a first current command. The hysteresis control unit couples the voltage control unit with the current control unit and configured to: in a first mode, when a detection current reaches a first threshold value, decouple the voltage control unit with the current control unit and generate a second current command to transmit to the current control unit; and when the first current command reaches a second threshold value, couple the voltage control unit with the current control unit, and transmit the first current command generated by the voltage control unit to the current control unit for switching to a second mode from the first mode of the power converter. The current control unit is configured to output a mode control signal according to the first current command and the second current command.

According to another embodiment, a power conversion method is provided. The power conversion method includes the following steps: generating a first current command by a voltage control unit; in a first mode, when a detection current reaches a first threshold value, decoupling the voltage control unit and a current control unit and generating a second current command to transmit to the current control unit by a hysteresis control unit; when the first current command reaches a second threshold value, coupling the voltage control unit with the current control unit and transmitting the first current command generated by the voltage control unit to the current control unit by the hysteresis control unit for switching to a second mode from the first mode of the power converter. The current control unit is configured to output a mode control signal according to the first current command and the second current command.

The above and other aspects of the disclosure will become better understood with regard to the following detailed description of the preferred but non-limiting embodiment (s). The following description is made with reference to the accompanying drawings.

Figure 1:
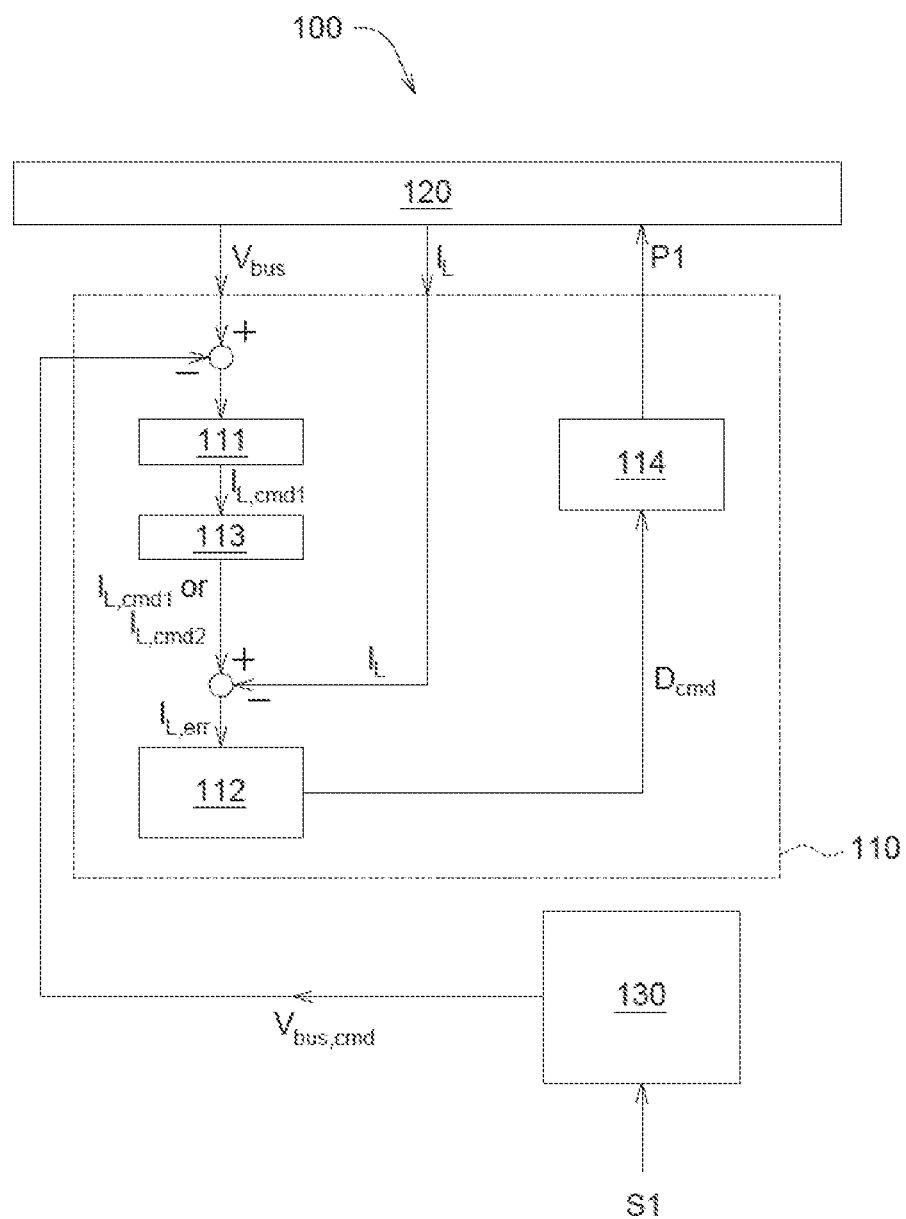
FIG. 1 is a schematic diagram of a power converter according to an embodiment of the present invention.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Figure 2:
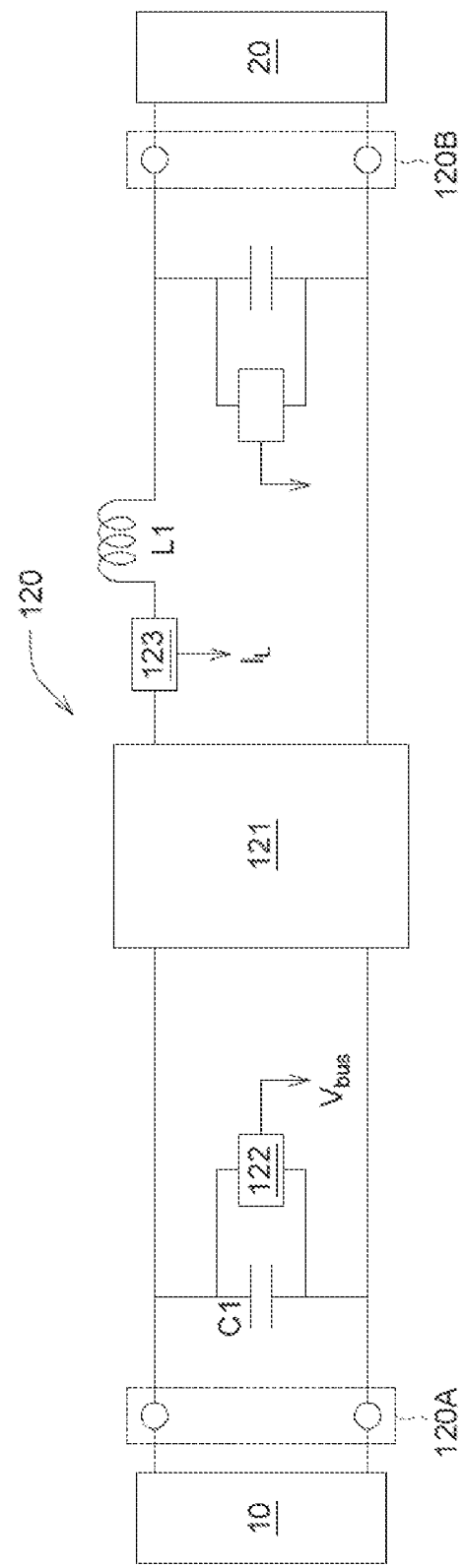
FIG. 2 is a schematic diagram of a controlled body of FIG. 1.
Figure 3A:
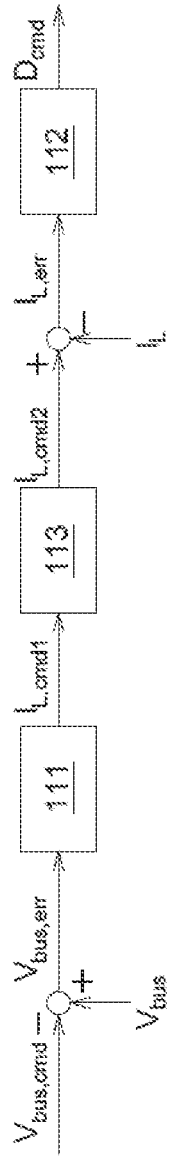
FIGS. 3A and 3B are system schematic diagrams of power supply mode switching of the power converter of FIG. 1.
Figure 3B:
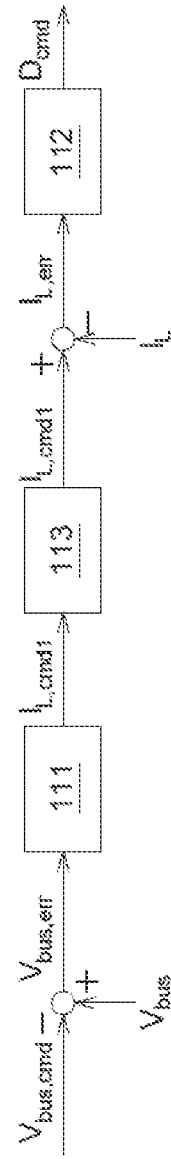
Figure 4:
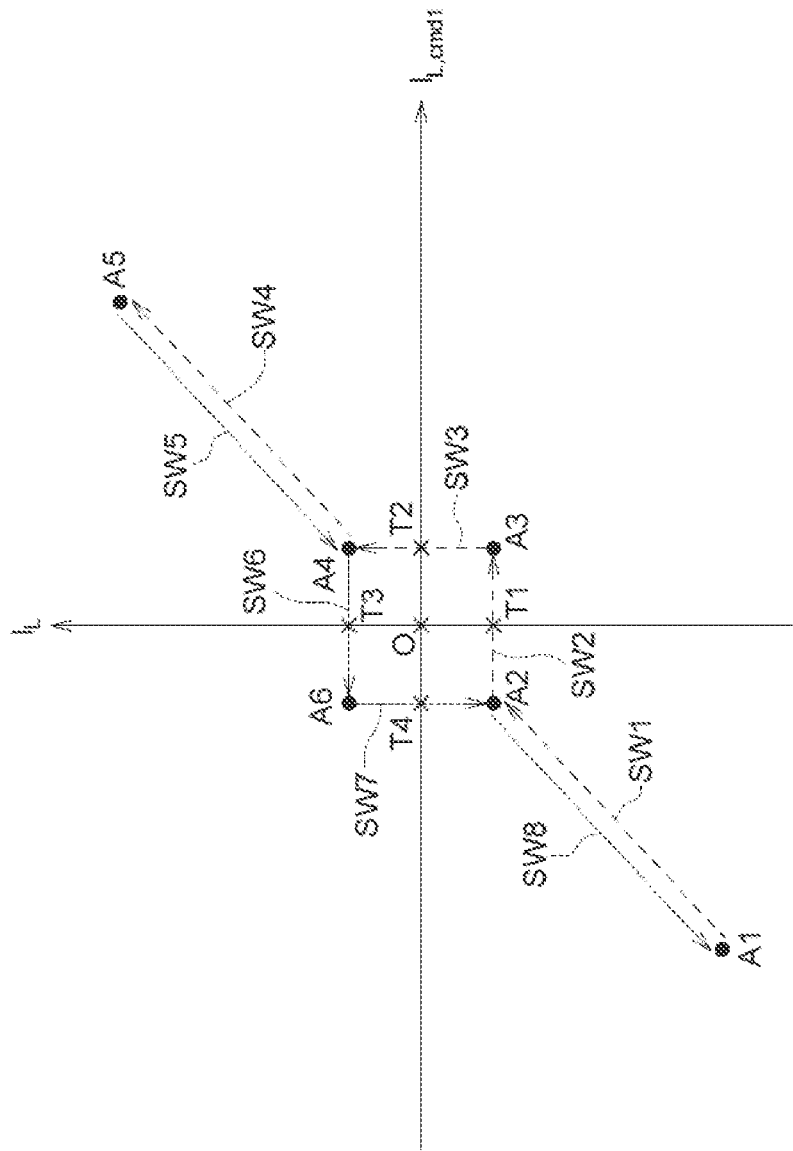
FIG. 4 is a schematic diagram of a mode switching path of the power converter of FIG. 1.

Referring to FIGS. 1 to 4, FIG. 1 is a schematic diagram of a power converter 100 according to an embodiment of the present invention, FIG. 2 is a schematic diagram of a controlled body 120 of FIG. 1, and FIGS. 3A and 3B are system schematic diagrams of power supply mode switching of the power converter 100 of FIG. 1, and FIG. 4 is a schematic diagram of a mode switching path of the power converter 100 of FIG. 1.

As shown in FIGS. 1 and 4, the power converter 100 includes a voltage control unit 111, a current control unit 112 and a hysteresis control unit 113. The voltage control unit 111 is configured to generate a first current command $I_{L,cmd1}$. The hysteresis control unit 113 couples the voltage control unit 111 with the current control unit 112. The hysteresis control unit 113 is configured to: (1). in a first mode, when a detection current $I_L$ reaches a first threshold value T1, decouple the voltage control unit 111 and the current control unit 112 and generate a second current command $I_{L,cmd2}$ transmitted to the current control unit 112 (as shown in FIG. 3A), and (2). when the first current command $I_{L,cmd1}$ reaches a second threshold value T2, couple the voltage control unit 111 with the current control unit 112 and transmit the first current command $I_{L,cmd1}$ generated by the voltage control unit 111 to the current control unit 111 (as shown in FIG. 3B) for switching the power converter 100 from the first mode to the second mode. The current control unit 112 is configured to output a mode control signal $D_{cmd}$ according to the first current command $I_{L,cmd1}$ and the second current command $I_{L,cmd2}$.

Since the hysteresis control unit 113 could decouple the voltage control unit 111 and the current control unit 112 at an appropriate time, and transmit the second current command $I_{L,cmd2}$ different from the first current command $I_{L,cmd1}$ to the current control unit 112, the mode switching path of the power converter 100 could be changed. For example, as shown in FIG. 4, the mode switching path of the power converter 100 according to the embodiment of the present invention could avoid passing through or being too close to an origin O, and thus it could avoid oscillation due to mode switching.

As shown in FIG. 1, a power flow of the power converter 100 is controlled by the current control unit 112 (controlled by the mode control signal $D_{cmd}$), and the current command of the current control unit 112 is provided by the voltage control unit 111. Compared with controlling the power flow by the voltage control unit 111, the speed of controlling the power flow using the current control unit 112 is faster.

As shown in FIG. 1, the power converter 100 further includes a controller 110, the controlled body 120 and a user interface 130. The voltage control unit 111, the current control unit 112 and the hysteresis control unit 113 could be disposed in the controller 110. In addition, the controller 110 further includes a switching signal generating unit 114, and the switching signal generating unit 114 also could be disposed in the controller 110. The switching signal generating unit 114 could generate a corresponding control signal P1 according to the mode control signal $D_{cmd}$ for controlling the controlled body 120 to perform mode switching. In an embodiment, the switching signal generating unit 114 is, for example, a Pulse Width Modulation (PWM) generating unit, and the control signal P1 is, for example, a PWM signal, wherein a duty cycle of the PWM signal could be changed according to the mode control signal $D_{cmd}$ for controlling the controlled body 120 to perform mode switching.

At least one of the voltage control unit 111, the current control unit 112, the hysteresis control unit 113 and the switching signal generating unit 114 is, for example, software, firmware or a physical circuit formed by at least one semiconductor process. At least two of the voltage control unit 111, the current control unit 112, the hysteresis control unit 113 and the switching signal generating unit 114 could be integrated into one unit. In addition, at least one of the voltage control unit 111, the current control unit 112, the hysteresis control unit 113 and the switching signal generating unit 114 could be spatially or physically separated from the controller 110 (but still be electrically connected to the controller 110).

As shown in FIG. 1, the user interface 130 could be coupled to the controller 110. The user interface 130 could receive a control command S1 from a user, and generate a corresponding voltage control command $V_{bus,cmd}$ according to the control command S1, wherein the voltage control command $V_{bus,cmd}$ could be transmitted to the controller 110, for example, the voltage control unit 111 of the controller 110. In an embodiment, the user interface 130 could communicate with the controller 110 through an interface (not shown), wherein the interface is, for example, an RS422 to RS232 interface; however, such exemplification is not meant to be for limiting. In addition, as shown in FIG. 3A, the controller 110 generates the mode control signal $D_{cmd}$ close to or conforms to the control command S1 by using suitable or even conventional automatic control according to a control loop (for example, a closed-loop equation) formed by the voltage control unit 111, the current control unit 112 and the hysteresis control unit 113. Although not described, an error $I_{L,err}$ is the difference between the second current command $I_{L,cmd2}$ and the detection current $I_L$, and the error $I_{L,err}$ could be included or used in the control loop.

As shown in FIG. 2, the controlled body 120 includes a first coupling terminal 120A and a second coupling terminal 120B, wherein the first coupling terminal 120A could be coupled to the first mode system 10 which supports the first mode, and the first mode system 10 is, for example, a first power source or a first load, while the second coupling terminal 120B could be coupled to a second mode system 20 which supports the second mode, and the second mode system 20 is, for example, a second power source or a second load. The first load is, for example, a power storage device, such as a battery disposed on a fixed object (for example, a building, a charging pile, etc.), a movable device (for example, an electric vehicle, etc.) or a portable device (for example, a mobile power device, etc.). The second load is, for example, an electronic device such as a home appliance, a computer, etc. In the present embodiment, the first mode system 10 belongs to, for example, a Local Bus System, such as a DC (Direct Current) bus (DC BUS) at a power generation end or a power storage end of a distributed power source, and the second mode system 20 belongs to, for example, a Global Bus System, such as a BUS in AC (Alternating Current) side.

As shown in FIG. 2, the controlled body 120 further includes a switch 121, a capacitor C1, an inductor L1, a capacitance detector 122 and an inductance detector 123. The capacitor C1 and the capacitance detector 122 could be coupled to a side of the switch 121 that conforms to (or supports) the first mode. The capacitance detector 122 could detect a capacitance voltage (herein referred to as "detection voltage $V_{bus}$") of the capacitor C1. The inductor L1 and the inductance detector 123 could be coupled to a side of the switch 121 that conforms to (supports) the second mode. The inductance detector 123 could detect an inductance current of the inductor L1 (herein referred to as "detection current $I_L$"). The switch 121 couples the capacitor C1 with the inductor L1. The switch 121 could convert the power storage of the first mode system 10 into the power consumption of the second mode system 20, or convert the power supply of the second mode system 20 into the power storage of the first mode system 10. Through switching between the two modes, the application flexibility of electric energy could be expanded. For example, when the electric vehicle (the first load) has idle power storage, the electric vehicle could feed the stored power back to the mains (the second power source) or to the load supporting the second mode (the second load). When the electric vehicle needs to be charged, the mains could supply power to the electric vehicle. In addition, the embodiment of the present invention does not limit the specific circuit structure of the switch 121, and it could include any suitable circuit or conventional circuit capable of converting between AC and DC.

In addition, although not shown, in an embodiment, the detection voltage $V_{bus}$ and detection current $I_L$ are processed by an amplifier and a converter, and then transmitted to the controller 110, wherein the amplifier is, for example, a differential amplifier, and the converter is, for example, an Analog-to-Digital Converter (ADC).

In addition, the first mode is, for example, one of the DC mode and the AC mode, and the second mode is, for example, the other of the DC mode and the AC mode. The DC mode is, for example, a Power Factor Correction (PFC) operation, and the AC mode is, for example, an inverter operation. In the present embodiment, the first mode is the DC mode, and the second mode is the AC mode, for example. In addition, as shown in FIG. 4, an axis of abscissa $I_{L,cmd1}$ is a boundary of the first mode and the second mode (the first mode and the second mode is divided by the axis of abscissa $I_{L,cmd1}$), wherein the area (negative value) below the axis of abscissa $I_{L,cmd1}$ of FIG. 4 is defined as the first mode, while the area (positive value) above the axis of abscissa $I_{L,cmd1}$ is defined as the second mode.

The detailed process of switching from the first mode to the second mode is described below.

Figure 5:
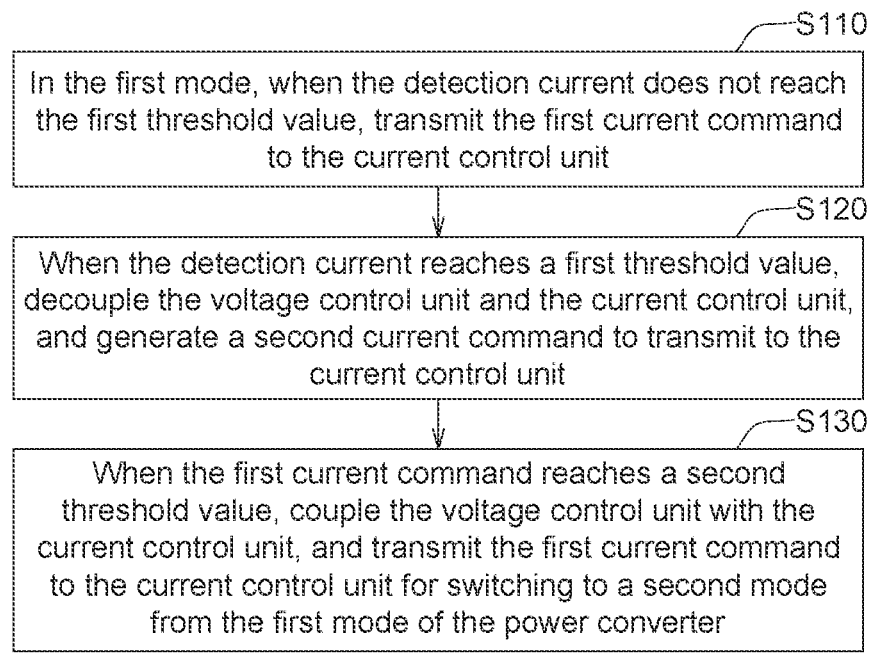
FIG. 5 is a schematic diagram of a flow chart of the mode switching of the power converter of FIG. 1.

Referring to FIGS. 4 and 5, FIG. 5 is a schematic diagram of a flow chart of the mode switching of the power converter 100 of FIG. 1. The axis of abscissa $I_{L,cmd1}$ of FIG. 4 represents the change (or variation) of the first current command $I_{L,cmd1}$, and an axis of ordinate represents the change (or variation) of the detection current $I_L$. In the present embodiment, the detection current $I_L$ is, for example, a peak value of the inductance current of the inductor L1 in FIG. 2, the value of the inductance current itself or an average value of the inductance current.

In step S110, as shown in FIGS. 3B and 4, at an operating point A1 (in the first mode), when the detection current $I_L$ does not reach the first threshold value T1, the hysteresis control unit 113 transmits the first current command $I_{L,cmd1}$ generated by the voltage control unit 111 to the current control unit 112. For example, the hysteresis control unit 113 does not process the first current command $I_{L,cmd1}$, but purely transmits the first current command $I_{L,cmd1}$ to the current control unit 112. The first current command $I_{L,cmd1}$ depends on an error $V_{bus,err}$ between the voltage control command $V_{bus,cmd}$ and the detection voltage $V_{bus}$. In other words, the value could be updated based on the error $V_{bus,err}$. Taking the control command S1 indicating switching from the first mode to the second mode as an example, in response to the control command S1, the controller 110 could generate the voltage control command $V_{bus,cmd}$ less than the detection voltage $V_{bus}$ (that is, $V_{bus} > V_{bus,cmd}$) for generating a positive (+) error $V_{bus,err}$. The positive value of the error $V_{bus,err}$ indicates a tendency of switching to the positive direction (the area above the axis of abscissa $I_{L,cmd1}$ in FIG. 4) from the negative direction (the area below the axis of abscissa $I_{L,cmd1}$ in FIG. 4).

In addition, the first threshold value T1 is, for example, a predetermined ratio of the peak value of the full load current. The predetermined ratio is, for example, any integer between 1% and 10%, such as 5%, 6%, 7%, etc. Taking the power converter 100 having a rated power of 5 kilowatts (kW) and a voltage of 220 volts as an example, the full load current is 22.72 amps, and the peak value of the full load current is 32.12 amps. In the case of the predetermined ratio being 5%, the obtained first threshold value T1 is −1.61 amps (the negative symbol "−" is defined based on the negative value of the first mode).

As shown in FIGS. 3B and 4, in a first switching path SW1 from the operating point A1 to an operating point A2, the value of the first current command $I_{L,cmd1}$ generated by the voltage control unit 112 is still continuously updated. For example, the first current command $I_{L,cmd1}$ is gradually changed from the negative value with a large (or larger) amplitude to the negative value with a small (or smaller) amplitude, so that the detection current $I_L$ decreases in amplitude with the first current command $I_{L,cmd1}$ (in the tendency of switching to the positive direction from the negative direction).

In step S120, as shown in FIGS. 3A and 4, at the operating point A2 (in the first mode), when the detection current $I_L$ reaches the first threshold value T1, the hysteresis control unit 113 decouples the voltage control unit 112 and the current control unit 110, generates the second current command $I_{L,cmd2}$, and transmits the second current command $I_{L,cmd2}$ to the current control unit 112. Due to the voltage control unit 112 being decoupled from the current control unit 110, the current control unit 110 is not controlled by the voltage control unit 112. For example, the first current command $I_{L,cmd1}$ generated by the voltage control unit 111 is not transmitted to the current control unit 112.

As shown in FIGS. 3A and 4, in a second switching path SW2 from the operating point A2 to an operating point A3, the voltage control unit 112 is not affected by the decoupling, and the updated first current command $I_{L,cmd1}$ is still continuously generated without changing the generation mode of the first current command $I_{L,cmd1}$, but not transmitted to the current control unit 112. In the second switching path SW2, the amplitude of the second current command $I_{L,cmd2}$ generated by the hysteresis control unit 113 is constant, so that the value of the detection current $I_L$ maintains constant. In the second switching path SW2, when the first current command $I_{L,cmd1}$ does not reach the second threshold value T2, the hysteresis control unit 113 continues transmitting the second current command $I_{L,cmd2}$ to the current control unit 112.

In step S130, as shown in FIGS. 3B and 4, at the operating point A3 (in the first mode), when the first current command $I_{L,cmd1}$ reaches the second threshold value T2 (reaches the operating point A3), the hysteresis control unit 113 recouples the voltage control unit 111 with the current control unit 112, and transmits the first current command $I_{L,cmd1}$ generated by the voltage control unit 111 to the current control unit 112 for switching to the second mode from the first mode of the power converter 100. After the voltage control unit 111 and the current control unit 112 are recoupled, the hysteresis control unit 113 does not generate the second current command $I_{L,cmd2}$, nor transmit signal to the current control unit 112. In other words, the hysteresis control unit 113 does not control the current control unit 112. In an embodiment, the second threshold value T2 could be a certain ratio of the current rating indicated by specification of the power converter 100, for example, any integer between 1% and 10%, such as 5%, 6%, 7%, etc.

As shown in FIGS. 3B and 4, in a third switching path SW3 from the operating point A3 to an operating point A4, the detection current $I_L$ ranges between the first threshold value T1 and the third threshold value T3, and the value of the first current command $I_{L,cmd1}$ generated by the voltage control unit 111 is substantially constant. Furthermore, due to the occurrence time of the third switching path SW3 is quite short, the variation of the first current command $I_{L,cmd1}$ is not significant, and thus it could be regarded as the constant.

As shown in FIGS. 3B and 4, at the operating point A4 (in the second mode), when the detection current $I_L$ reaches the third threshold value T3, the hysteresis control unit 113 continues transmitting the first current command $I_{L,cmd1}$ generated by the voltage control unit 111 to the current control unit 112. The third threshold value T3 is determined in a manner similar to or the same as that of the first threshold value T1. For example, the third threshold value T3 is, for example, a predetermined ratio of the peak value of the full load current. The predetermined ratio is, for example, any integer between 1% and 10%, such as 5%, 6%, 7%, etc. Taking the power converter 100 having a rated power of 5 kilowatts (kW) and a voltage of 220 volts as an example, the full load current is 22.72 amps, and the peak value of the full load current is 32.12 amps. In the case of the predetermined ratio being 5%, the obtained third threshold value T3 is +1.61 amps (the negative symbol "+" is defined based on the positive value of the second mode).

As shown in FIGS. 3B and 4, in a fourth switching path SW4 from the operating point A4 to an operating point A5 (in the second mode), when the detection current $I_L$ is greater than the third threshold value T3, the first current command $I_{L,cmd1}$ generated by the voltage control unit 111 is continuously updated. For example, the first current command $I_{L,cmd1}$ s gradually changed from the positive value with a small amplitude to the positive value with a large amplitude, so that the detection current $I_L$ increases in amplitude with the first current command $I_{L,cmd1}$ (increases the transmission power in the positive direction).

As shown in FIGS. 3B and 4, in the fourth switching path SW4, when the detection current $I_L$ does not reach the operating point A5, the hysteresis control unit 113 transmits the first current command $I_{L,cmd1}$ generated by the voltage control unit 111 to the current control unit 112. For example, the hysteresis control unit 113 does not process the first current command $I_{L,cmd1}$, but purely transmits the first current command $I_{L,cmd1}$ to the current control unit 112. The first current command $I_{L,cmd1}$ depends on an error $V_{bus,err}$ between the voltage control command $V_{bus,cmd}$ and the detection voltage $V_{bus}$. As shown in FIG. 3B, the controller 110 could continuously generate the voltage control command $V_{bus,cmd}$ less than the detection voltage $V_{bus}$ (that is, $V_{bus}>V_{bus,cmd}$) for generating the positive (+) error $V_{bus,err}$. In the fourth switching path SW4, the positive value of the error $V_{bus,err}$ indicates the tendency of continuously switching in the positive direction (the area above the axis of abscissa $I_{L,cmd1}$ in FIG. 4). When the detection current $I_L$ reaches the operating point A5, it indicates that the power flow commutation is completed.

The process of switching to the first mode from the second mode is similar to the above-mentioned process of switching to the second mode from the first mode, and the following description is made with reference to the accompanying FIGS. 3 and 4.

As shown in FIGS. 3B and 4, at the operating point A5 (in the second mode), when the detection current $I_L$ does not reach the third threshold value T3, the hysteresis control unit 113 transmits the first current command $I_{L,cmd1}$ to the current control unit 112. The first current command $I_{L,cmd1}$ depends on the error $V_{bus,err}$ between the voltage control command $V_{bus,cmd}$ and the detection voltage $V_{bus}$. Taking the control command S1 indicating switching from the second mode to the first mode as an example, in response to the control command S1, the controller 110 could generate the voltage control command $V_{bus,cmd}$ greater than the detection voltage $V_{bus}$(that is, $V_{bus}<V_{bus,cmd}$) for generating a negative (−) error $V_{bus,err}$. The negative value of the error $V_{bus,err}$ indicates a tendency of switching to the negative direction (the area below the axis of abscissa $I_{L,cmd1}$ in FIG. 4) from the positive direction (the area above the axis of abscissa $I_{L,cmd1}$ in FIG. 4).

As shown in FIGS. 3B and 4, in a fifth switching path SW5 from the operating point A5 to the operating point A4 (in the second mode), the value of the first current command $I_{L,cmd1}$ generated by the voltage control unit 112 still continues being updated. For example, the first current command $I_{L,cmd1}$ s gradually changed from the positive value with a large amplitude to the positive value with a small amplitude, so that the detection current $I_L$ decreases in amplitude with the first current command $I_{L,cmd1}$ (in the tendency of switching to the positive direction from the negative direction).

As shown in FIGS. 3A and 4, at the operating point A4 (in the second mode), when the detection current $I_L$ reaches the third threshold value T3, the hysteresis control unit 113 decouples the voltage control unit 112 and the current control unit 110, generate the second current command $I_{L,cmd2}$, and transmits the second current command $I_{L,cmd2}$ to the current control unit 112. Due to the voltage control unit 112 being decoupled from the current control unit 110, the current control unit 110 is not controlled by the voltage control unit 112. Furthermore, the first current command $I_{L,cmd1}$ generated by the voltage control unit 111 is not transmitted to the current control unit 112.

As shown in FIGS. 3A and 4, in a sixth switching path SW6 from the operating point A4 to an operating point A6, the voltage control unit 112 is not affected by the decoupling, and the updated first current command $I_{L,cmd1}$ s still continuously generated without changing the generation mode of the first current command $I_{L,cmd1}$, but not transmitted to the current control unit 112. In the sixth switching path SW6, the amplitude of the second current command $I_{L,cmd2}$ generated by the hysteresis control unit 113 is constant, so that the value of the detection current $I_L$ maintains constant. In the sixth switching path SW6, when the first current command $I_{L,cmd1}$ does not reach the fourth threshold value T4, the hysteresis control unit 113 continues transmitting the second current command $I_{L,cmd2}$ to the current control unit 112. The manner of determining the fourth threshold value T4 is the same as that of the aforementioned second threshold value T2, and the similarities will not be described herein again.

As shown in FIGS. 3B and 4, in the operating point A6 (in the second mode), when the first current command $I_{L,cmd1}$ reaches the fourth threshold value T4 (reaches the operating point A6), the hysteresis control unit 113 recouples the voltage control unit 111 with the current control unit 112, and transmit the first current command $I_{L,cmd1}$ generated by the voltage control unit 111 to the current control unit 111 for switching to first mode from the second mode of the power converter 100. After the voltage control unit 111 and the current control unit 112 are recoupled, the hysteresis control unit 113 does not generate the second current command $I_{L,cmd2}$, nor transmits signal to the current control unit 112. In other words, the hysteresis control unit 113 does not control the current control unit 112.

As shown in FIGS. 3B and 4, in a seventh switching path SW7 from the operating point A6 to the operating point A2, the detection current $I_L$ ranges between the third threshold value T3 and the first threshold value T1, and the value of the first current command $I_{L,cmd1}$ generated by the voltage control unit 111 is substantially constant. Furthermore, since the occurrence time of the seventh switching path SW7 is quite short, the variation of the first current command $I_{L,cmd1}$ is not significant, and thus it could be regarded as the constant.

As shown in FIGS. 3B and 4, at the operating point A2 (in the first mode), when the detection current $I_L$ reaches the fourth threshold value T4, the hysteresis control unit 113 continues transmitting the first current command $I_{L,cmd1}$ generated by the voltage control unit 111 to the current control unit 112.

As shown in FIGS. 3B and 4, in an eighth switching path SW8 from the operating point A2 to the operating point A1 (in the first mode), when the detection current $I_L$ is greater than the first threshold value T1, the first current command $I_{L,cmd1}$ generated by the voltage control unit 111 is continuously updated. For example, the first current command $I_{L,cmd1}$ is gradually changed from the negative value with a small amplitude to the negative value with a large amplitude, so that the detection current $I_L$ increases in amplitude (increases the transmission power in the negative direction).

As shown in FIGS. 3B and 4, in the eighth switching path SW8, when the detection current $I_L$ does not reach the operating point A1, the hysteresis control unit 113 transmits the first current command $I_{L,cmd1}$ generated by the voltage control unit 111 to the current control unit 112. For example, the hysteresis control unit 113 does not process the voltage control unit 111, but purely transmits the first current command $I_{L,cmd1}$ to the current control unit 112. The first current command $I_{L,cmd1}$ depends on the error $V_{bus,err}$ between the voltage control command $V_{bus,cmd}$ and the detection voltage $V_{bus}$. As shown in FIG. 3B, the controller 110 could continuously generate the voltage control command $V_{bus,cmd}$ greater than the detection voltage $V_{bus}$ (that is, $V_{bus}<V_{bus,cmd}$) for generating the negative (−) error $V_{bus,err}$. In the eight switching path SW8, the negative value of the error $V_{bus,err}$ indicates the tendency of continuously switching in the negative direction (the area below the axis of abscissa $I_{L,cmd1}$ in FIG. 4). When the detection current $I_L$ reaches the operating point A1, it indicates that the power flow commutation is completed.

To sum up, the embodiments of the present disclosure discloses the power converter and the power conversion method using the same, wherein the hysteresis control unit could selectively decouple the voltage control unit and the current control unit, and change the current command, so that the switching path avoids the commutation point (for example, the origin in FIG. 4), to prevent from the commutation oscillation and prevent the controller (or control block) of the automatic control equation from running out of control.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A power converter, comprises:
   a voltage control unit configured to generate a first current command;
   a current control unit; and
   a hysteresis control unit coupling the voltage control unit with the current control unit, and configured to:
      in a first mode, when a detection current reaches a first threshold value, decouple the voltage control unit and the current control unit, and generate a second current command to transmit to the current control unit; and
      when the first current command reaches a second threshold value, couple the voltage control unit with the current control unit, and transmit the first current command generated by the voltage control unit to the current control unit for switching to a second mode from the first mode of the power converter;
   wherein the current control unit is configured to output a mode control signal according to the first current command and the second current command.

2. The power converter of claim 1, wherein the hysteresis control unit is further configured to:
   in the first mode, when the detection current does not reach the first threshold value, transmit the first current command generated by the voltage control unit to the current control unit.

3. The power converter of claim 1, wherein when the first current command reaches the second threshold value, the second current command generated by the hysteresis control unit has an amplitude which is constant, and the detection current maintains constant.

4. The power converter of claim 1, wherein when the first current command does not reach the second threshold value, the voltage control unit continuously updates the first current command.

5. The power converter of claim 1, wherein the hysteresis control unit is further configured to:
   when the first current command does not reach the second threshold value, continuously transmit the second current command to the current control unit.

6. The power converter of claim 1, wherein when the detection current ranges between the first threshold value and a third threshold value, the voltage control unit is configured to generate the first current command which is constant.

7. The power converter of claim 4, wherein the hysteresis control unit is further configured to:
   when the detection current reaches a third threshold value, transmit the first current command generated by the voltage control unit to the current control unit.

8. The power converter of claim 6, wherein when the detection current is greater than the third threshold value, the voltage control unit continuously updates the first current command.

9. The power converter according to claim 1, wherein the hysteresis control unit is further configured to:
   in the second mode, when the detection current reaches a third threshold value, decouple the voltage control unit and the current control unit and generate the second current command to transmit to the current control unit; and
   when the first current command reaches a fourth threshold value, decouple the voltage control unit and the current control unit, and transmit the first current command generated by the voltage control unit to the current control unit for switching to the first mode from the second mode of the power converter.

10. A power conversion method, comprises:
    generating a first current command by a voltage control unit;
    in a first mode, when a detection current reaches a first threshold value, decoupling the voltage control unit and a current control unit, and generating a second current command to transmit to the current control unit by a hysteresis control unit;
    when the first current command reaches a second threshold value, coupling the voltage control unit with the current control unit and transmitting the first current command generated by the voltage control unit to the current control unit by the hysteresis control unit for switching to a second mode from the first mode of the power converter;
    wherein the current control unit is configured to output a mode control signal according to the first current command and the second current command.

11. The power conversion method according to claim 10, further comprises:
    in the first mode, when the detection current does not reach the first threshold value, transmitting the first current command generated by the voltage control unit to the current control unit by the hysteresis control unit.

12. The power conversion method according to claim 10, further comprises:
    when the first current command reaches the second threshold value, generating the second current command whose amplitude is constant, wherein the detection current maintains constant.

13. The power conversion method according to claim 10, further comprises:
    when the first current command does not reach the second threshold value, continuously updating the first current command by the voltage control unit.

14. The power conversion method according to claim 10, further comprises:
    when the first current command does not reach the second threshold value, continuously transmitting the second current command to the current control unit by the hysteresis control unit.

15. The power conversion method according to claim 10, further comprises:
   when the detection current ranges between the first threshold value and a third threshold value, generating the first current command which is constant by the voltage control unit.

16. The power conversion method according to claim 13, further comprises:
   when the detection current reaches a third threshold value, transmitting the first current command generated by the voltage control unit to the current control unit by the hysteresis control unit.

17. The power conversion method according to claim 15, further comprises:
   when the detection current is greater than the third threshold value, continuously updating the first current command by the voltage control unit.

18. The power conversion method according to claim 10, further comprises:
   in the second mode, when the detection current reaches a third threshold value, decoupling the voltage control unit and the current control unit, and generating the second current command to transmit to the current control unit by the hysteresis control unit;
   when the first current command reaches a fourth threshold value, coupling the voltage control unit with the current control unit, and transmitting the first current command generated by the voltage control unit to the current control unit by the hysteresis control unit for switching to the first mode from the second mode.

* * * * *